US007346851B2

(12) United States Patent
Munoz-Bustamante

(10) Patent No.: US 7,346,851 B2
(45) Date of Patent: Mar. 18, 2008

(54) SYSTEM AND METHOD FOR IMPROVED SCROLL MOUSE OPERATION

(75) Inventor: Carlos Munoz-Bustamante, Durham, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 623 days.

(21) Appl. No.: 10/980,412

(22) Filed: Nov. 3, 2004

(65) Prior Publication Data

US 2006/0095862 A1    May 4, 2006

(51) Int. Cl.
  *G06F 3/048*    (2006.01)
(52) U.S. Cl. ............... 715/764; 715/781; 715/784; 715/785
(58) Field of Classification Search ........... 345/163, 345/684; 715/789
  See application file for complete search history.

(56) References Cited

U.S. PATENT DOCUMENTS

| | | | | |
|---|---|---|---|---|
| 5,726,687 | A | 3/1998 | Belfiore et al. ............ 345/341 |
| 5,802,161 | A * | 9/1998 | Svoronos et al. ...... 379/216.01 |
| 6,075,533 | A * | 6/2000 | Chang ........................ 715/786 |
| 6,337,694 | B1 * | 1/2002 | Becker et al. ............... 345/684 |
| 6,496,180 | B1 | 12/2002 | Hedman ...................... 345/166 |
| 6,628,996 | B1 | 9/2003 | Sezaki et al. .................. 700/83 |
| 6,657,639 | B2 * | 12/2003 | Yu .............................. 345/684 |
| 6,690,365 | B2 * | 2/2004 | Hinckley et al. ........... 345/173 |
| 6,788,284 | B1 * | 9/2004 | Culler ........................ 345/156 |
| 6,865,718 | B2 * | 3/2005 | Levi Montalcini ......... 715/786 |
| 7,042,441 | B2 * | 5/2006 | Adams et al. .............. 345/163 |
| 7,173,637 | B1 * | 2/2007 | Hinckley et al. ........... 345/684 |
| 2002/0140665 | A1 * | 10/2002 | Gordon ...................... 345/156 |
| 2003/0001866 | A1 | 1/2003 | Bredow et al. ............. 345/660 |
| 2003/0025673 | A1 | 2/2003 | Ledbetter et al. ........... 345/163 |
| 2003/0179184 | A1 | 9/2003 | Bromba et al. ............. 345/163 |
| 2004/0021635 | A1 * | 2/2004 | Lou ........................... 345/163 |
| 2004/0021694 | A1 | 2/2004 | Doar .......................... 345/784 |
| 2005/0010594 | A1 * | 1/2005 | Chen et al. .............. 707/104.1 |
| 2007/0080944 | A1 * | 4/2007 | Parees ........................ 345/163 |

OTHER PUBLICATIONS

"Smart Scroll X", http://www.marcmoini.com/sx_en.html, pp. 1-4, no date.*

* cited by examiner

*Primary Examiner*—Doug Hutton
*Assistant Examiner*—Gregory A DiStefano
(74) *Attorney, Agent, or Firm*—Van Leeuwen & Van Leeuwen; Carlos Munoz-Bustaman

(57) ABSTRACT

A system and method for improved scroll mouse operation is presented. A user operates a computer mouse, which includes a scroll ring that functions as a middle mouse button. During operation, the user configures a scroll suppression manager to discard a particular number of scroll commands when the user moves the computer mouse's scroll ring. The user specifies a number of scroll commands to discard when the computer mouse's pointer location is positioned over particular mouse-over conditions, such as a web page link or a drop down menu. Once the scroll suppression manager has discarded the user-specified number of scroll commands, the scroll suppression manager processes subsequent scroll commands until the user stops scrolling or the user selects an object on the user's computer screen.

17 Claims, 7 Drawing Sheets

SYSTEM AND METHOD FOR IMPROVED SCROLL MOUSE OPERATION

BACKGROUND OF THE INVENTION

1. Technical Field

The present invention relates in general to a system and method for improved scroll mouse operation. More particularly, the present invention relates to a system and method for suppressing one or more initial scroll commands that are received from a computer mouse whose scroll ring is configured to double as a middle mouse button.

2. Description of the Related Art

Computer mice have revolutionized the user interface experience between a user and a computer system. Before computer mice, a user was required to type in each command, or depress a computer's keyboard arrow keys to navigate around a computer screen. Since the inception of computer mice, a user is able to easily navigate around a computer screen.

Technology advancements allow a user to purchase a computer mouse with optical and wireless technology. In addition, scroll mice are available that incorporate a "scroll ring" into the mouse. Besides using the scroll ring to scroll up and down a page of data on a computer screen, the scroll ring may also be configured for other tasks. For example, in some applications, a user may depress the "Control" key on a keyboard and move the scroll ring in order to zoom in or zoom out of a document. Furthermore, a user may configure the scroll ring to function as a middle mouse button. In this case, a user depresses the scroll ring in order to activate a pre-configured middle mouse button function, such as "selecting an item."

A challenge found with operating a scroll ring as a middle mouse button, however, is that when a user attempts to depress the scroll ring, the user may inadvertently move the scroll ring forward or backward, causing scroll movements prior to processing the middle button function. When this occurs, a computer system may "mis-select" an object due to the inadvertent scroll movement. For example, when browsing the Internet, the middle mouse button may open a web page in a new window when the mouse's pointer is positioned over a web page link. In this example, if a user inadvertently scrolls up or down before depressing the scroll ring, the computer system may not identify the user's desired web page.

What is needed, therefore, is a system and method for discarding one or more initial scroll commands that are received from a computer mouse based upon particular user preferences.

SUMMARY

It has been discovered that the aforementioned challenges are resolved by discarding a predetermined number of scroll commands when a computer mouse's pointer location matches a user-specified mouse-over condition. A user operates a computer mouse, which includes a scroll ring that functions as a middle mouse button. During operation, the user may configure his computer system in such a manner as to discard a particular number of inadvertent scroll commands when the user moves the computer mouse's scroll ring. For example, a user may have difficulty depressing the mouse's scroll ring without accidentally moving the scroll ring in a forward or reverse direction. In this example, the user may configure his computer system to discard a particular number of scroll commands when the user's mouse pointer is positioned over a particular object, such as a web page link or a drop down menu.

A user operates a computer mouse, which includes a scroll ring, in order to send particular mouse commands to the user's computer system. The scroll ring provides the user with the ability to scroll up or scroll down a page of data, as well as functioning as a middle mouse button. When the user moves the scroll ring in a forward or reverse direction, either intentionally or unintentionally, the scroll mouse sends scroll commands to a scroll suppression manager, which is included in the user's computer system. For example, the scroll suppression manager may reside within a mouse driver, an operating system, or a particular software application.

The scroll suppression manager receives the scroll command, and retrieves scroll suppression preferences from a storage area. The scroll suppression preferences include a scroll suppression flag, user-specified mouse-over conditions, and a scroll command discard quantity. The scroll suppression manager checks the state of the scroll suppression flag in order to determine whether the user has enabled scroll suppression mode. If the user has enabled scroll suppression mode, the scroll suppression manager checks as to whether the mouse's pointer location corresponds to one of the user-specified mouse-over conditions. For example, the user may have specified "over a web page link" as a mouse-over condition for the computer system to discard a particular number of scroll commands. In this example, if the mousers pointer location is positioned over a web page link, then the computer system determines that one of the user-specified mouse-over conditions is met.

If the mouse's pointer location meets one of the user-specified mouse-over conditions, the scroll suppression manager increments a suppression counter, and checks the value of the suppression counter with the user-specified scroll command discard quantity. The scroll command discard quantity corresponds to a number of scroll commands to discard. If the value of the suppression counter is less than the value of the scroll command discard quantity, the scroll suppression manager discards the scroll command.

On the other hand, if the value of the suppression counter equals the value of the scroll command discard quantity, the scroll suppression manager processes the scroll command and resets the value of the suppression counter. For example, the user may intentionally move the scroll ring in a reverse direction in order to scroll down a page of data, and his mouse pointer may be inadvertently positioned over a web page link, which is configured as a mouse-over condition. In this example, the scroll suppression manager discards scroll commands up until the suppression counter reaches the value of the scroll command discard quantity, and then processes the scroll commands as usual. Once the scroll suppression manager starts processing scroll commands, the scroll suppression manager continues to process scroll commands until the user stops scrolling or selects an item on his computer screen, such as a web page link.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
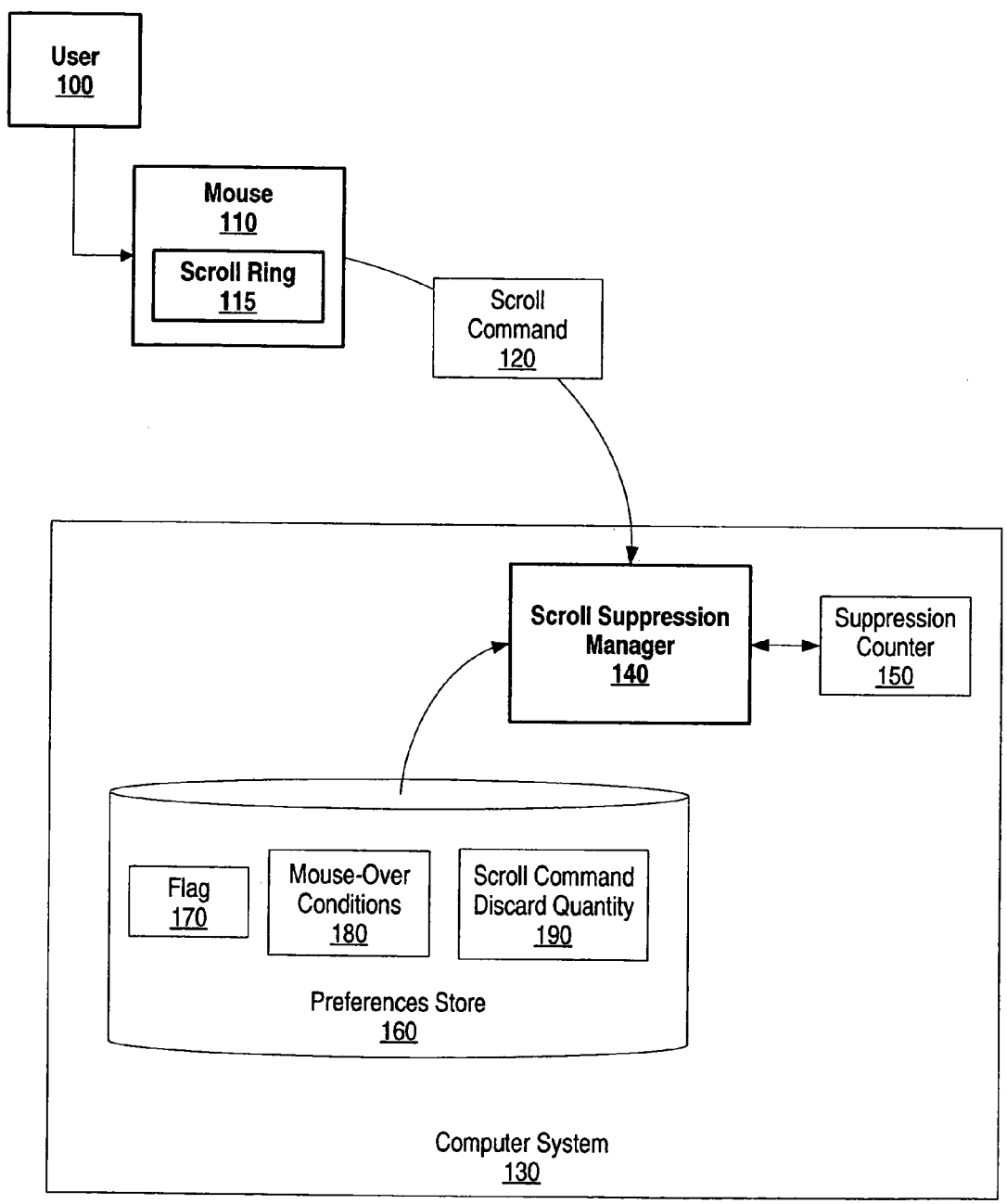
FIG. 1 is a diagram showing a scroll suppression manager discarding a scroll command based upon one or more scroll suppression preferences.

FIG. 1 is a diagram showing a scroll suppression manager discarding a scroll command based upon one or more scroll suppression preferences. A user operates a computer mouse, which includes a scroll ring that functions as a middle mouse button. During operation, the user may configure his computer system in such a manner as to discard a particular number of inadvertent scroll commands when the user moves the computer mousers scroll ring. For example, a user may have difficulty depressing the mouse's scroll ring to select a web page link without accidentally moving the scroll ring in a forward or reverse direction. In this example, the user may configure his computer system to discard a particular number of scroll commands when the user's mouse pointer is positioned over web page links.

User 100 operates mouse 110 in order to send particular mouse commands to computer system 130. Mouse 110 includes scroll ring 115, which allows user 100 to scroll up or scroll down a page of data. In addition, scroll ring 115 functions as a middle mouse button such that user 100 may depress scroll ring 115 in order to select a particular item on a page of data, such as a web page link. When user 100 moves scroll ring 115 in a forward or reverse direction, either intentionally or unintentionally, mouse 110 sends scroll command 120 to scroll suppression manager 140, which is included in computer system 130. For example, scroll suppression manager 140 may reside within a mouse driver, an operating system, or a particular application.

Scroll suppression manager 140 receives scroll command 120, and accesses scroll suppression preferences from preferences store 160. The scroll suppression preferences include scroll suppression flag 170, mouse-over conditions 180, and scroll command discard quantity 190. Preferences store 160 may be stored on a nonvolatile storage area, such as a computer hard drive.

Scroll suppression manager 140 checks the state of scroll suppression flag 170 in order to determine whether user 100 has enabled scroll suppression mode. If user 100 has enabled scroll suppression mode, scroll suppression manager 140 checks as to whether mouse 110's pointer location corresponds to one of the conditions included in mouse-over conditions 180. For example, one of the mouse-over conditions may be "over a web page link." In this example, if mouse 110's pointer position is over a web page link, then one of the mouse-over conditions is met (see FIGS. 2, 6, and corresponding text for further details regarding mouse-over conditions).

If mouse 110's pointer location corresponds to one of the mouse-over conditions included in mouse-over conditions 180, scroll suppression manager 140 increments suppression counter 150, and checks the value of suppression counter 150 with scroll command discard quantity 190. Scroll command discard quantity 190 corresponds to a number of scroll commands to discard, which has been specified by user 100. If the value of suppression counter 150 is less than the value of scroll command discard quantity 190, scroll suppression manager 140 discards scroll command 120. On the other hand, if the value of suppression counter 150 equals the value of scroll command discard quantity 190, scroll suppression manager 140 processes scroll command 120 and resets the value of suppression counter 150. For example, user 100 may intentionally move scroll ring 115 in a forward direction in order to scroll down a page of data, and his mouse pointer may inadvertently be positioned over a web page link, which is configured as a mouse-over condition. In this example, scroll suppression manager 140 discards scroll commands up until suppression counter 150 reaches the value of scroll command discard quantity 190, and then processes the scroll commands as usual (see FIG. 5 and corresponding text for further details regarding scroll command processing).

Once scroll suppression manager 140 starts processing scroll commands, scroll suppression manager 140 continues to process scroll commands until user 100 stops scrolling or selects an item on his computer screen, such as a web page.

In one embodiment, computer system 130 may be configured such that scroll suppression manager 140 does not use preferences to determine whether to discard a scroll command but, instead, always suppresses a particular amount of scroll commands whenever mouse 110's pointer location is positioned over a particular object, such as a web page link.

Figure 2A:
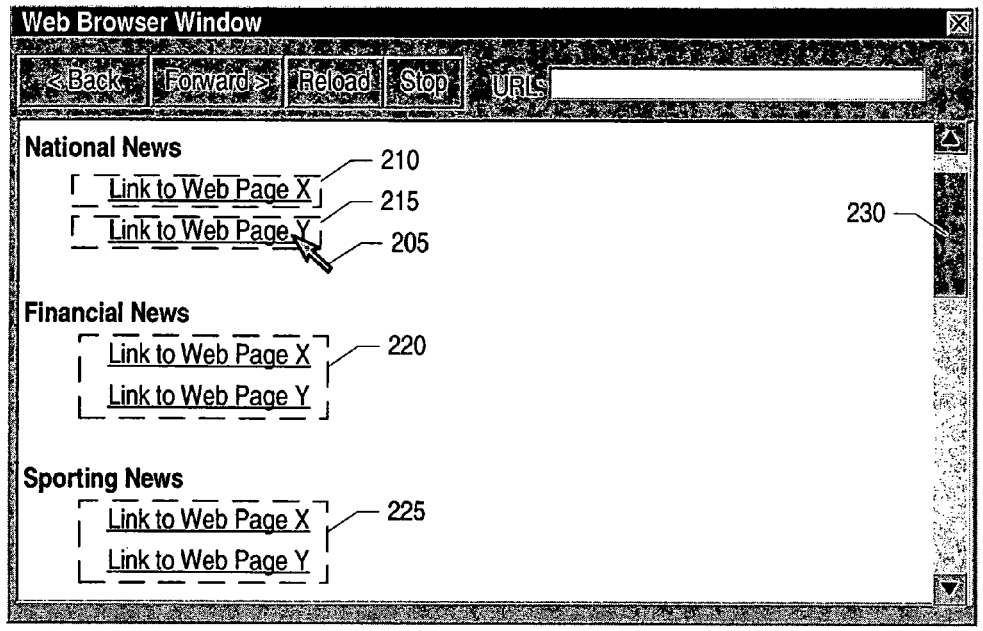
FIG. 2A is a web browser window that includes web page links, whereby a user selects one of the web page links using a scroll ring that doubles as a middle mouse button.

FIG. 2A is a web browser window that includes web page links, whereby a user selects one of the web page links using a scroll ring that doubles as a middle mouse button. A user configures a computer mouse such that the computer mouse's scroll button functions as a middle mouse button. As such, the user is able to depress the scroll ring in order to perform a particular command, such as select a web page link.

Window 200 shows web page links 210 through 225. As can be seen by viewing scroll bar 230, the page of data that is displayed in window 200 also includes other data that is positioned below web page links 225, which a user is not able to view without scrolling down the page of data.

The user moves mouse pointer 205 around the page of data that is included in window 200, and wishes to select web page link 215. When the user depresses the mouse scroll ring to select web page link 205, the user accidentally moves the scroll ring forward, which typically signifies scrolling down the page of data. Since the user enabled scroll suppression mode, a scroll suppression manager receives the accidentally initiated scroll command and compares the position of mouse pointer 205 with scroll suppression preferences (see FIG. 3 and corresponding text for further details regarding scroll suppression mode enablement).

The scroll suppression manager identifies that the user requested the scroll suppression manager to discard the first two received scroll commands whenever the user's mouse pointer is positioned over a web page link. As such, the scroll suppression manager discards the scroll command, causing mouse pointer 205 to stay stationary. The scroll ring's "selection" command may then be processed accurately, allowing the user to properly select web page link 215.

Figure 2B:
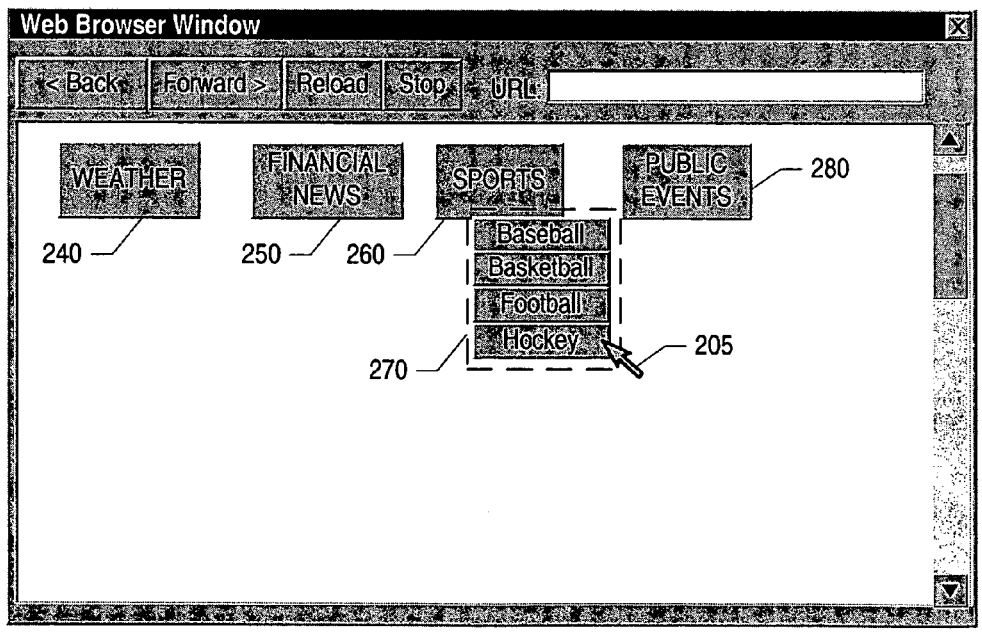
FIG. 2B is a web browser window that includes drop down menus, whereby a user selects one of the drop down menus using a scroll ring that doubles as a middle mouse button.

FIG. 2B is a web browser window that includes drop down menus, whereby a user selects one of the drop down menus using a scroll ring that doubles as a middle mouse button. FIG. 2B is similar to FIG. 2A with the exception that the page of data that is displayed in window 200 in FIG. 2B includes drop down menus instead of web page links.

Window 200 includes selection buttons 240, 250, 260, and 280. When a user selects, or positions his mouse pointer over, one of the selection buttons, window 200 displays a drop down menu, such as drop down menu 270. The user may configure scroll suppression preferences such that a particular number of scroll commands are discarded whenever mouse pointer 205 is positioned over a drop down menu, such as that shown in FIG. 2B. In turn, a user may select one of the menu items included in drop-down menu 270 using his scroll ring without concern for accidentally moving the scroll ring in a forward or reverse direction, causing inadvertent scroll command generation.

Figure 3:
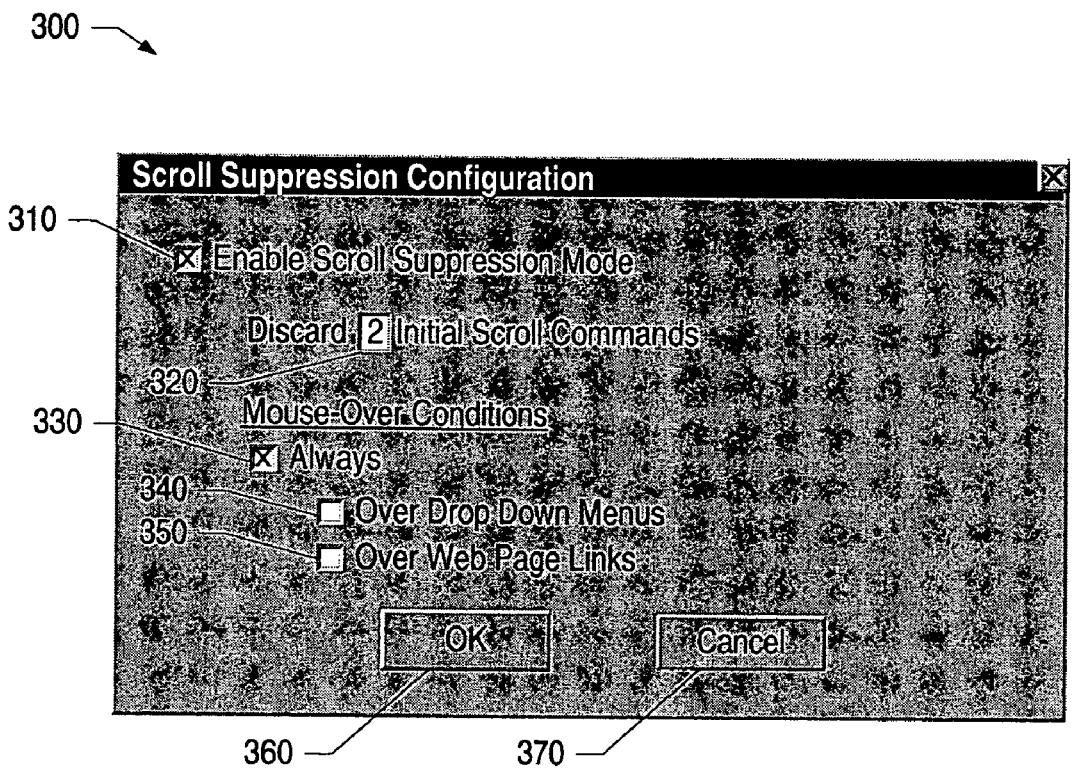
FIG. 3 is a user interface window that allows a user to configure scroll suppression preferences.

FIG. 3 is a user interface window that allows a user to configure scroll suppression preferences. A computer system displays window 300 when a user wishes to configure scroll suppression preferences. Window 300 includes check box 310, which a user selects when the user wishes to enable scroll suppression mode. When a user selects check box 310, processing sets a scroll suppression flag that signifies scroll suppression enablement.

Window 300 also includes text box 320, which specifies a scroll command discard quantity. The scroll command discard quantity is the number of scroll commands to discard when a mousers pointer location meets a particular mouse-over condition that is selected by the user (see below). For example, if the scroll command discard quantity is "2," then two scroll commands are discarded when a user's mouse pointer is positioned over a mouse-over condition, such as a web page link or a drop down menu.

Check boxes 330 through 350 allow a user to specify particular mouse-over conditions in which to discard scroll commands. When a user selects check box 330, processing always discards a number of scroll commands up to the scroll command discard quantity that is specified in text box 320. When a user selects check box 340, processing waits until a mouser's pointer location is positioned over a drop down menu before discarding a number of scroll commands (see FIG. 2B and corresponding text for further details regarding drop down menu positioning). When a user selects check box 350, processing waits until a mouse's pointer location is positioned over a web page link before discarding a number of scroll commands (see FIG. 2A and corresponding text for further details regarding web page link positioning).

When the user is ready to save scroll suppression preferences, the user selects command button 360, which saves the scroll suppression preferences in a nonvolatile storage area. If the user does not wish to save scroll suppression preferences, the user selects command button 370 to cancel any changes.

Figure 4:
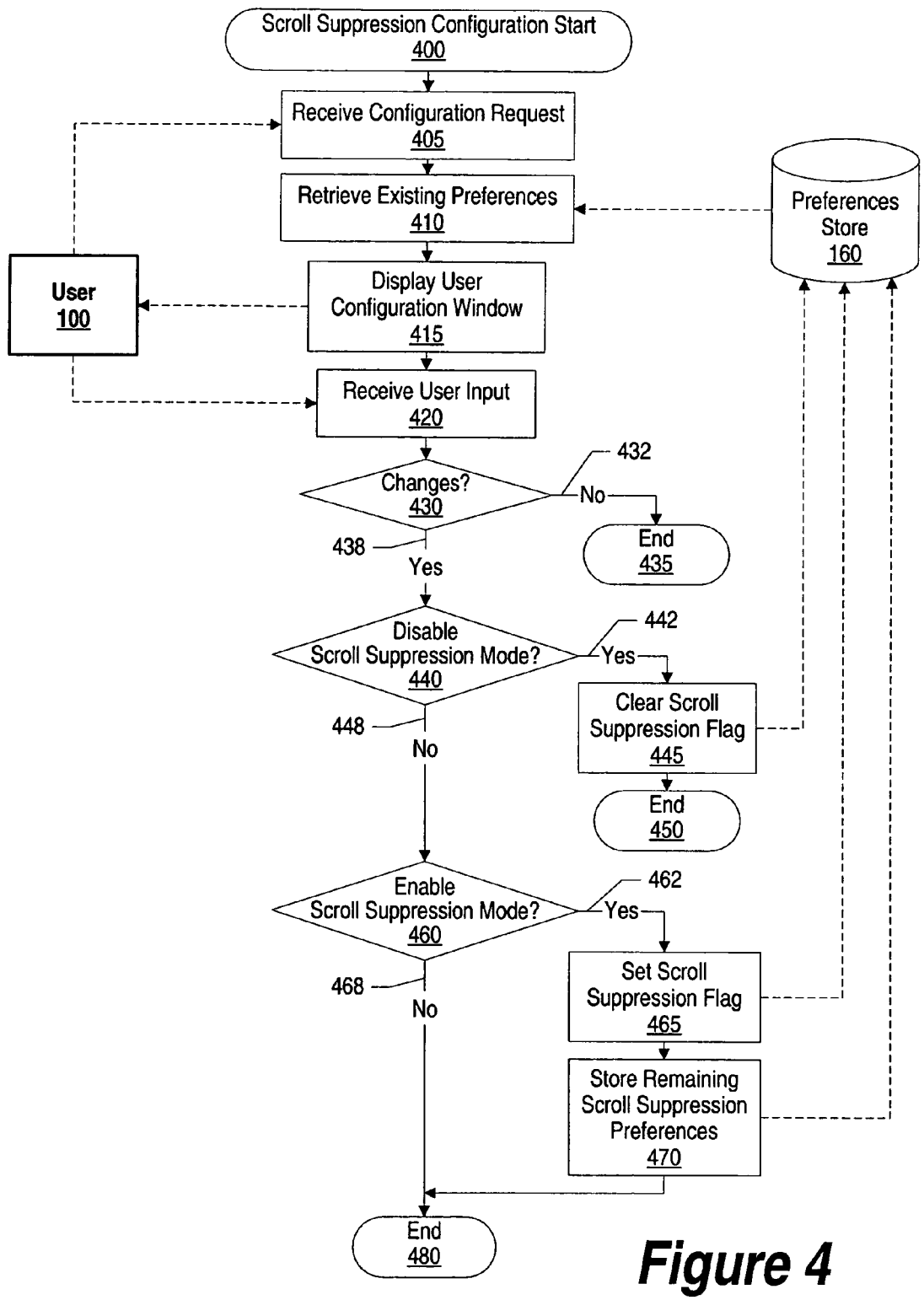
FIG. 4 is a flowchart showing steps taken in configuring scroll suppression preferences for use in determining which scroll commands to discard that are received from a computer mouse's scroll ring.
Figure 5:
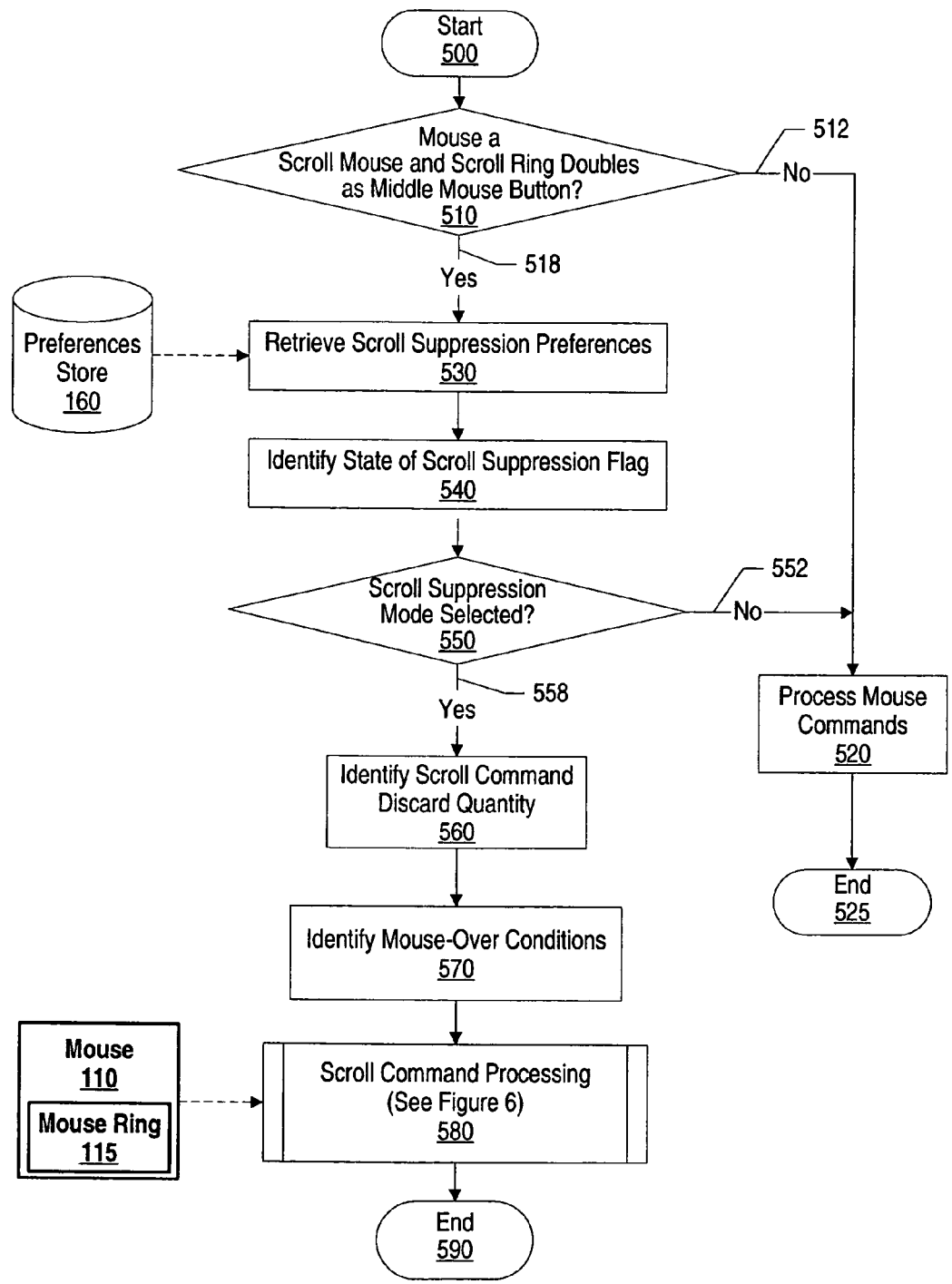
FIG. 5 is a high-level flowchart showing steps taken in identifying whether to suppress a scroll command.
Figure 6:
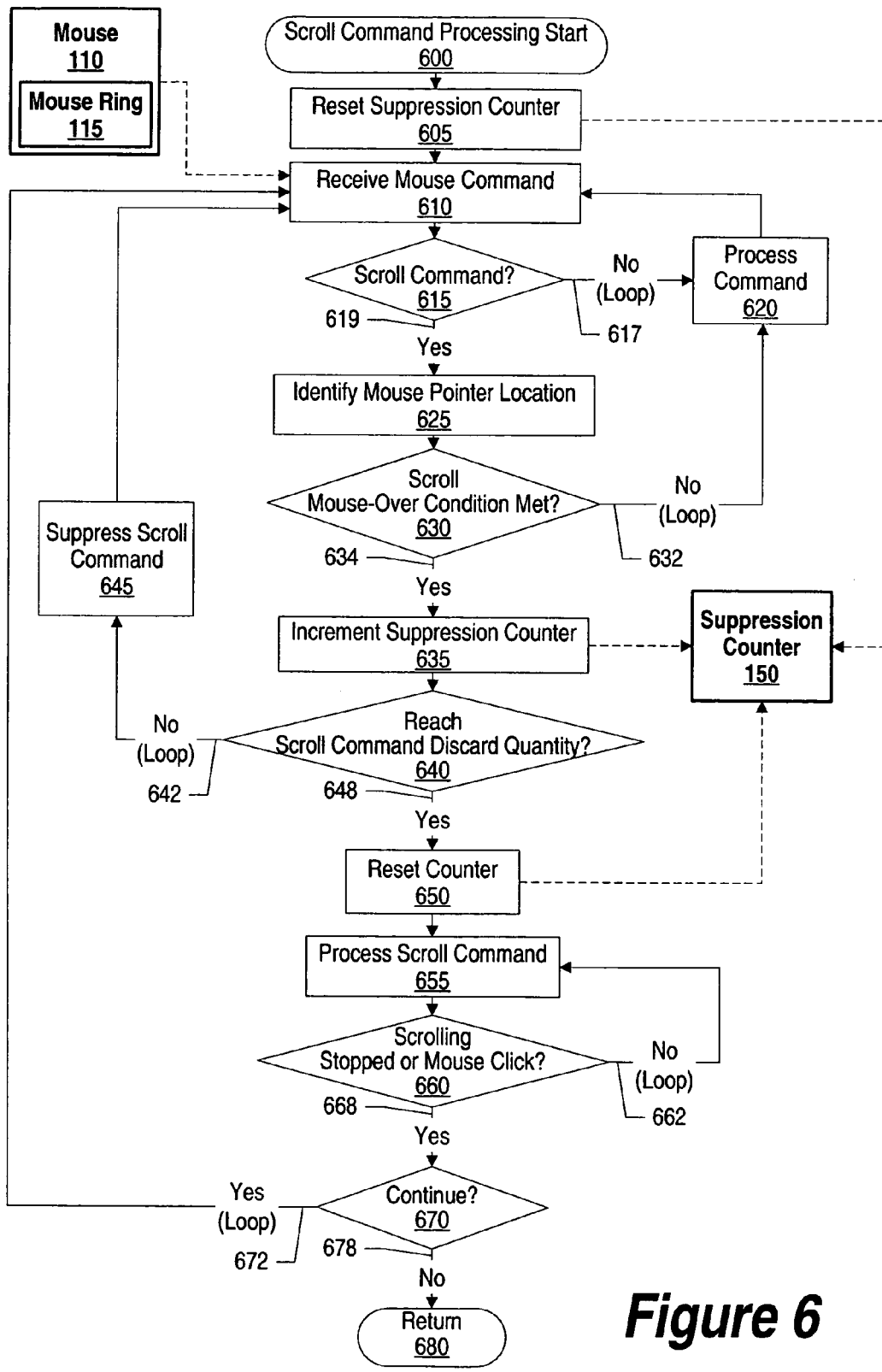
FIG. 6 is a detail flowchart showing steps taken in discarding a scroll command.

FIG. 4 is a flowchart showing steps taken in configuring scroll suppression preferences for use in determining which scroll commands to discard that are received from a computer mouse's scroll ring. FIGS. 4 through 6 describe steps taken in implementing a scroll suppression command tool that may be implemented as a logic chip, such as a microcontroller, or in software by a main processor or processors (see FIG. 7 and corresponding text for further details regarding an example of a computer system that is capable of performing the computing operations described in FIGS. 4 through 6).

Scroll suppression configuration commences at 400, whereupon processing receives a configuration request from user 100 (step 405). At step 410, processing retrieves existing scroll suppression preferences from preferences store 160. If this is user 100's first time configuring scroll suppression preferences, processing may retrieve default scroll suppression preferences from preferences store 160. For example, default scroll suppression preferences may be configured such that two scroll commands are discarded each time that a mouse pointer is positioned over a web page link. Processing displays a user configuration window that includes the retrieved preferences to user 100 at step 415. Preferences store 160 and user 100 are the same as that shown in FIG. 1.

At step 420, processing receives user input from user 100. A determination is made as to whether user 100 wishes to make changes to the existing scroll suppression preferences (decision 430). If user 100 did not make changes to the existing preferences, decision 430 branches to "No" branch 432 whereupon processing ends at 435. On the other hand, if user 100 did make changes to the existing preferences, decision 430 branches to "Yes" branch 438 whereupon a determination is made as to whether user 100 wishes to disable scroll suppression mode (decision 440). For example, user 100 may rarely move his scroll ring when he uses it to select an item. In this example, user 100 may wish to have each scroll command processed and, therefore, none discarded.

If user 100 wishes to disable scroll suppression mode, decision 440 branches to "Yes" branch 442 whereupon processing clears a scroll suppression flag in preferences store 160 at step 445, and processing ends at 450. The scroll suppression flag informs processing as to whether scroll suppression mode is enabled. On the other hand, if user 100 does not wish to disable scroll suppression mode, decision 440 branches to "No" branch 448 bypassing scroll suppression clearing steps.

A determination is made as to whether user 100 wishes to enable scroll suppression mode (decision 460). If user 100 wishes to enable scroll suppression mode, decision 460 branches to "Yes" branch 462 whereupon processing sets the scroll suppression flag that is located in preferences store 160 (step 465). At step 470, processing stores remaining scroll suppression preferences that are received from user 100 in preferences store 160. For example, user 100 may wish to discard two scroll commands when user 100's mouse is positioned over a drop down menu (see FIG. 3 and corresponding text for further details regarding scroll suppression preferences). On the other hand, if user 100 does not wish to enable scroll suppression mode, decision 460 branches to "No" branch 468 bypassing scroll suppression configuration steps. Processing ends at 480.

FIG. 5 is a high-level flowchart showing steps taken in identifying whether to suppress a scroll command. Processing commences at 500, whereupon a determination is made as to whether a user's computer mouse is a scroll mouse and whether the user has enabled the computer mouse's scroll ring to double as a middle mouse button (decision 510). For example, the user may configure the scroll ring to perform a "select" operation when the scroll ring is depressed. If the user's mouse is not a scroll mouse or if the user's mouse is a scroll mouse whose scroll ring has not been enabled to double as a middle mouse button, decision 510 branches to "No" branch 512 whereupon processing processes mouse commands it receives in a normal manner (step 520) and processing ends at 525.

On the other hand, if the user's mouse is a scroll mouse whose scroll ring is enabled to double as a middle mouse button, decision 510 branches to "Yes" branch 518 whereupon processing retrieves scroll suppression preferences from preferences store 160 at step 530. The user previously configured the scroll suppression preferences using a user configuration window. In one embodiment, if the user has not configured scroll suppression preferences, processing may retrieve default scroll suppression preferences (see FIGS. 2, 4, and corresponding text for further details regarding scroll suppression preference configuration). Preferences store 160 is the same as that shown in FIG. 1.

At step 540, processing identifies the state of a scroll suppression flag that is included in the retrieved scroll suppression preferences. The scroll suppression flag signifies whether a user has enabled or disabled scroll suppression mode. A determination is made as to whether scroll suppression mode is enabled based upon the state of the scroll suppression flag (decision 550). If the scroll suppression mode is not enabled, decision 550 branches to "No" branch 552 whereupon processing processes mouse commands it receives in a normal manner (step 520) and processing ends at 525. On the other hand, if the scroll suppression mode is enabled, decision 550 branches to "Yes" branch 558.

Processing identifies a scroll command discard quantity at step 560. The scroll command discard quantity corresponds to the number of scroll commands to discard when a mouse pointer's positioning meets a mouse-over condition. At step 570, processing identifies mouse-over conditions that are selected by a user. The mouse-over conditions specify when to discard scroll commands, such as when a mouse pointer is positioned over a web page link or a drop down menu.

Once scroll suppression preferences are identified, processing receives scroll commands from mouse 110 in response to movements of scroll ring 115, and determines whether to discard the scroll commands or process the scroll commands (pre-defined process block 580, see FIG. 6 and corresponding text for further details). Mouse 110 and scroll ring 115 are the same as that shown in FIG. 1. Processing ends at 590.

FIG. 6 is a detail flowchart showing steps taken in discarding a scroll command. Scroll command processing commences at 600, whereupon processing resets suppression counter 150 at step 605. Suppression counter 150 is the same as that shown in FIG. 1, which tracks the number of scroll commands that are discarded during a particular time. For example, suppression counter 150 may include a stored value of "1" which indicates that processing has discarded one received scroll command.

At step 610, processing receives a mouse command from mouse 110. Mouse 110 includes scroll ring 115 that doubles as a middle mouse button. Mouse 110 and scroll ring 115 are the same as that shown in FIG. 1. A determination is made as to whether the mouse command is a scroll command (decision 615). Mouse 110 issues a scroll command when a user moves scroll ring 115 in a forward or reverse direction. If the mouse command is not a scroll command, decision 615 branches to "No" branch 617 whereupon processing loops back to process the mouse command (step 620). This looping continues until processing receives a scroll command, at which point decision 615 branches to "Yes" branch 619 whereupon processing identifies mouse 110's pointer location (step 625). The mouse pointer location corresponds to the location of a mouse pointer on a user's computer screen. For example, the user may have positioned his mouse pointer over a drop down menu item.

A determination is made as to whether mouse 110's pointer location meets a mouse-over condition (decision 630). Using the example described above, if the user configured scroll suppression preferences such that processing should discard a scroll command when the user's mouse pointer is located over a drop down menu item, then, in this example, the mouse's pointer location meets a mouse-over condition.

If one of the mouse-over conditions is not met, decision 630 branches to "No" branch 632 whereupon processing loops back to process the scroll command (step 620). This looping continues until processing receives a scroll command when mouse 110's pointer location meets a mouse-over condition, at which point decision 630 branches to "Yes" branch 634.

At step 635, processing increments suppression counter 150, which signifies that processing received a scroll command in conjunction with mouse 110's pointer location meeting one or more mouse-over conditions. A determination is made as to whether the value of suppression counter 150 equals a scroll command discard quantity (decision 640). The scroll command discard quantity is configured by a user during scroll suppression preference configuration and corresponds to the number of scroll commands that the user wishes processing to discard before processing a scroll command. For example, a user specifies a scroll command discard quantity of "2" when the user wishes his computer system to discard the first two scroll commands it receives when the user's mouse pointer is positioned over a mouse-over condition.

If the value of suppression counter 150 does not equal the scroll command discard quantity, decision 640 branches to "No" branch 642 which loops back to suppress the scroll command (step 645), and wait for another mouse command. This looping continues until processing receives enough scroll commands such that the value of suppression counter 150 equals the scroll command discard quantity, at which point decision 640 branches to "Yes" branch 648.

Processing resets suppression counter 150 at step 650, and processes the scroll command at step 655. A determination is made as to whether the mouse has stopped scrolling or whether processing has received a mouse click (decision 660). For example, a user may be scrolling down a web page that includes multiple web page links, and, in this example, processing continues to process scroll commands until the user stops scrolling or selects a web page link. If the user has not stopped scrolling and has not issued a mouse click, decision 660 branches to "No" branch 662 which loops back to continue to process scroll commands. This looping continues until the user stops scrolling or issues a mouse click, at which point decision 660 branches to "Yes" branch 668.

A determination is made as to whether to continue mouse command processing (decision 670). If mouse command processing should continue, decision 670 branches to "Yes" branch 672 whereupon processing loops back to continue to receive mouse commands. This looping continues until mouse command processing should terminate, at which point decision 670 branches to "No" branch 678 whereupon processing returns at 680.

Figure 7:
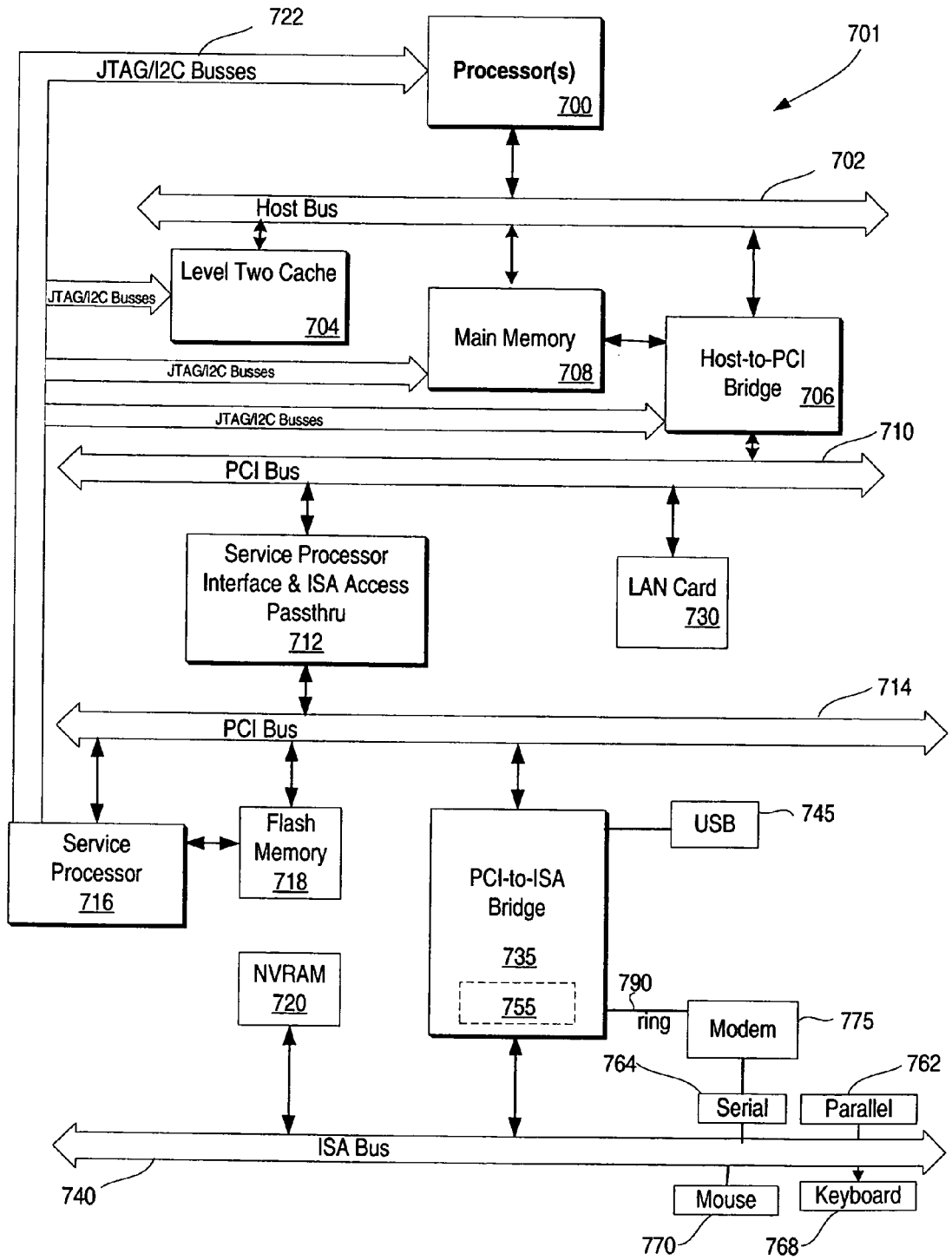
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
  receiving a scroll command and a mouse pointer location corresponding to a computer mouse;
  determining whether to discard the scroll command based upon the mouse pointer location, the determining comprising:
    identifying one or more scroll suppression preferences, the scroll suppression preferences corresponding to the computer mouse;

incrementing a suppression counter based upon the mouse pointer location matching one of the scroll suppression preferences; and comparing the value of the suppression counter with a predetermined scroll command discard quantity, the predetermined scroll command discard quantity being included in the scroll suppression preferences; and discarding the scroll command in response to the determination.

2. The method of claim 1 further comprising:

resetting the suppression counter and processing the scroll command in response to the comparing.

3. The method of claim 2 further comprising:

receiving subsequent scroll commands after the processing of the scroll command; and processing the subsequent scroll commands up until receiving a mouse click that is generated from the computer mouse.

4. The method of claim 1 wherein at least one of the scroll suppression preferences is selected from the group consisting of a user-specified mouse-over condition, a drop down menu, a scroll suppression flag, and a scroll command discard quantity.

5. The method of claim 1 further comprising:

detecting whether the computer mouse supports a middle mouse button functionality by depressing a scroll ring, wherein moving the scroll ring in a forward or reverse direction generates the scroll command.

6. The method of claim 1 further comprising:

receiving a configuration request from a user;

displaying a configuration window to the user in response to receiving the configuration request;

receiving the scroll suppression preferences from the user in response to the displaying; and enabling a scroll suppression flag based on the scroll suppression preferences, wherein the scroll suppression flag is used in the determining.

7. A program product stored in a computer storage medium, the computer storage medium containing instructions for execution by a computer, which, when executed by the computer, cause the computer to execute a method comprising:

receiving a scroll command and a mouse pointer location corresponding to a computer mouse;

determining whether to discard the scroll command based upon the mouse pointer location, wherein the determining comprises:

identifying one or more scroll suppression preferences, the scroll suppression preferences corresponding to the computer mouse;

incrementing a suppression counter based upon the mouse pointer location matching one of the scroll suppression preferences; and comparing the value of the suppression counter with a predetermined scroll command discard quantity, the predetermined scroll command discard quantity being included in the scroll suppression preferences; and discarding the scroll command in response to the determination.

8. The program product of claim 7 wherein the method further comprises:

resetting the suppression counter and processing the scroll command in response to the comparing.

9. The program product of claim 8 wherein the method further comprises:

receiving subsequent scroll commands after the processing of the scroll command; and process the subsequent scroll commands up until receiving a mouse click that is generated from the computer mouse.

10. The program product of claim 7 wherein at least one of the scroll suppression preferences is selected from the group consisting of a user-specified mouse-over condition, a drop down menu, a scroll suppression flag, and a scroll command discard quantity.

11. The program product of claim 7 wherein the method further comprises:

detecting whether the computer mouse supports a middle mouse button functionality by depressing a scroll ring, wherein moving the scroll ring in a forward or reverse direction generates the scroll command.

12. The program product of claim 7 wherein the method further comprises:

receiving a configuration request from a user;

displaying a configuration window to the user in response to receiving the configuration request;

receiving the scroll suppression preferences from the user in response to the displaying; and enabling a scroll suppression flag based on the scroll suppression preferences, wherein the scroll suppression flag is used in the determining.

13. An information handling system comprising:

one or more processors;

a computer mouse;

a memory accessible by the processors;

one or more nonvolatile storage devices accessible by the processors; and a scroll command suppression tool accessible by said computer mouse which discards scroll commands, the scroll command suppression tool being effective to:

receive a scroll command and a mouse pointer location corresponding to the computer mouse;

determine whether to discard the scroll command based upon the mouse pointer location, wherein the determination comprises the scroll command suppression tool being further effective to:

identify one or more scroll suppression preferences located in one of the nonvolatile storage devices, the scroll suppression preferences corresponding to the computer mouse;

increment a suppression counter based upon the mouse pointer location matching one of the scroll suppression preferences, the scroll suppression counter located in the memory; and compare the value of the suppression counter with a predetermined scroll command discard quantity, the predetermined scroll command discard quantity being included in the scroll suppression preferences; and discard the scroll command in response to the determination.

14. The information handling system of claim 13 wherein the scroll command suppression tool is further effective to:

reset the suppression counter located in the memory and processing the scroll command in response to the comparing.

15. The information handling system of claim 14 wherein the scroll command suppression tool is further effective to:
  receive subsequent scroll commands corresponding to the computer mouse after the processing of the scroll command; and
  process the subsequent scroll commands up until receiving a mouse click that is generated from the computer mouse.

16. The information handling system of claim 13 wherein at least one of the scroll suppression preferences is selected from the group consisting of a user-specified mouse-over condition, a drop down menu, a scroll suppression flag, and a scroll command discard quantity.

17. The information handling system of claim 13 wherein the scroll command suppression tool is further effective to:
  detect whether the computer mouse supports a middle mouse button functionality by depressing a scroll ring, wherein moving the scroll ring in a forward or reverse direction generates the scroll command.

* * * * *